US010082043B2

United States Patent
Lefebvre et al.

(10) Patent No.: US 10,082,043 B2
(45) Date of Patent: Sep. 25, 2018

(54) SEGMENTED MULTI-LOBE MIXER

(71) Applicant: Pratt & Whitney Canada Corp., Longueuil (CA)

(72) Inventors: Guy Lefebvre, St-Bruno-de-Montarville (CA); Rene Paquet, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 301 days.

(21) Appl. No.: 14/750,094

(22) Filed: Jun. 25, 2015

(65) Prior Publication Data
US 2016/0376928 A1 Dec. 29, 2016

(51) Int. Cl.
*F02K 1/48* (2006.01)
*F01D 25/30* (2006.01)
*F02K 1/38* (2006.01)
*B01F 3/02* (2006.01)
*F01D 25/00* (2006.01)

(52) U.S. Cl.
CPC .............. *F01D 25/30* (2013.01); *B01F 3/026* (2013.01); *F01D 25/005* (2013.01); *F02K 1/386* (2013.01); *F02K 1/48* (2013.01); *F05D 2220/32* (2013.01); *F05D 2240/40* (2013.01); *F05D 2260/30* (2013.01); *F05D 2260/96* (2013.01); *F05D 2300/6033* (2013.01); *Y02T 50/672* (2013.01)

(58) Field of Classification Search
CPC ... F02K 1/386; F02K 1/48; F02K 1/46; F05D 2240/40; F05D 2260/96
See application file for complete search history.

(56) References Cited

U.S. PATENT DOCUMENTS

| 4,240,252 | A | * | 12/1980 | Sargisson | F02K 1/386 181/220 |
| 4,335,801 | A | * | 6/1982 | Stachowiak | F02K 1/48 181/213 |
| 5,666,802 | A | * | 9/1997 | Lair | F02K 1/06 239/265.29 |
| 7,043,898 | B2 | | 5/2006 | Rago | |

(Continued)

FOREIGN PATENT DOCUMENTS

| CA | 2897284 A1 * | 1/2016 | ............. F02C 7/18 |
| FR | 2908465 A1 * | 5/2008 | ............. F02K 1/06 |

OTHER PUBLICATIONS

English translation of FR2908465A1, provided by Espacenet.*
Search Report issued in counterpart EP application No. 16176115.0 dated Nov. 29, 2016.

Primary Examiner — Ehud Gartenberg
Assistant Examiner — Thomas Burke
(74) Attorney, Agent, or Firm — Norton Rose Fulbright Canada LLP

(57) ABSTRACT

A multi-lobe exhaust mixer has an annular body composed of a plurality of circumferentially adjacent lobe segments. The lobe segments may be made of a ceramic matrix composite material to reduce the weight of the mixer and ensure proper behavior when exposed to high thermal gradients. Each lobe segment may have partial lobes at circumferentially opposed ends thereof and at least one complete lobe therebetween. The partial lobes of the circumferentially adjacent lobe segments combining to conjointly form complete lobes at the junction between the circumferentially adjacent lobe segments. The partial lobes may be nested into each other to dampen vibrations.

13 Claims, 6 Drawing Sheets

(56) References Cited

U.S. PATENT DOCUMENTS

| | | |
|---|---|---|
| 7,677,026 B2 | 3/2010 | Conete et al. |
| 8,584,356 B2 * | 11/2013 | Philippe ............... F02K 1/386 |
| | | 181/220 |
| 8,590,316 B2 | 11/2013 | Conete et al. |
| 8,984,890 B2 | 3/2015 | Dindar et al. |
| 2008/0115484 A1 | 5/2008 | Conete et al. |
| 2014/0075919 A1 | 3/2014 | Durocher et al. |
| 2014/0298772 A1 | 10/2014 | Klingels et al. |

\* cited by examiner

SEGMENTED MULTI-LOBE MIXER

TECHNICAL FIELD

The application relates generally to aircraft gas turbine engines and, more particularly, to a multi-lobe exhaust mixer.

BACKGROUND OF THE ART

In turbofan engines, high velocity air from the turbofan core is mixed with low velocity air from the bypass duct, and this mixed air is then exhausted from the engine. Turbofan engines generally use exhaust mixers in order to increase the mixing of the high and low velocity fluid flows.

For manufacturability reasons, exhaust mixers are typically made out of metal, such as nickel alloy. However, such metal exhaust mixers add non-negligible weight to the engines. Also exhaust mixers are exposed to important thermal gradients and, thus, the ability of being able to use thermo structural composite materials, such as a ceramic matrix composite material (CMC), would be beneficial. There is, thus, a need for a new multi-lobe exhaust mixer construction allowing for the use of different thermally stable materials in the fabrication of an exhaust mixer.

SUMMARY

In one aspect, there is provided a multi-lobe exhaust mixer for a gas turbine engine, the multi-lobe exhaust mixer comprising: an annular body having an array of circumferentially distributed alternating inner and outer lobes, the inner lobes including troughs forming an inner radial portion thereof and the outer lobes including crests forming an outer radial portion thereof, the annular body being segmented into a plurality of individual lobe segments, and wherein the individual lobe segments overlap at the crests or the troughs.

In another aspect, there is provided a multi-lobe exhaust mixer for a gas turbine engine, the multi-lobe exhaust mixer comprising: an annular body composed of a plurality of circumferentially adjacent lobe segments, each lobe segment having partial lobes at circumferentially opposed ends thereof and at least one complete lobe therebetween, the partial lobes of the circumferentially adjacent lobe segments combining to conjointly form complete lobes at the junction between the circumferentially adjacent lobe segments.

In a further aspect, there is provided a multi-lobe exhaust mixer for a gas turbine engine of the type having an annular core flow passage for channelling a high temperature core flow along an axis of the engine, and a bypass passage extending concentrically about the core flow passage for axially channelling bypass air; the multi-lobe exhaust mixer comprising: an annular body having an array of circumferentially distributed alternating inner and outer lobes, the outer lobes protruding radially outwardly into the bypass passage and the inner lobes protruding radially inwardly into the core flow passage, the annular body being composed of a plurality of individual lobe segments which alternately radially outwardly and radially inwardly overlap each other around the annular body.

In a still further aspect, there is provided a lobe segment adapted to be assembled to similar circumferentially adjacent lobe segments to form a multi-lobe exhaust mixer of a gas turbine engine, the lobe segment having partial lobes at circumferentially opposed ends thereof and at least one complete lobe therebetween, the partial lobes of the lobe segment being nestable into corresponding partial lobes of circumferentially adjacent lobe segments.

DESCRIPTION OF THE DRAWINGS

Reference is now made to the accompanying figures in which:

FIG. 4b is a rear isometric view of the individual lobe segment shown in FIG. 4a;

DETAILED DESCRIPTION

Figure 1:
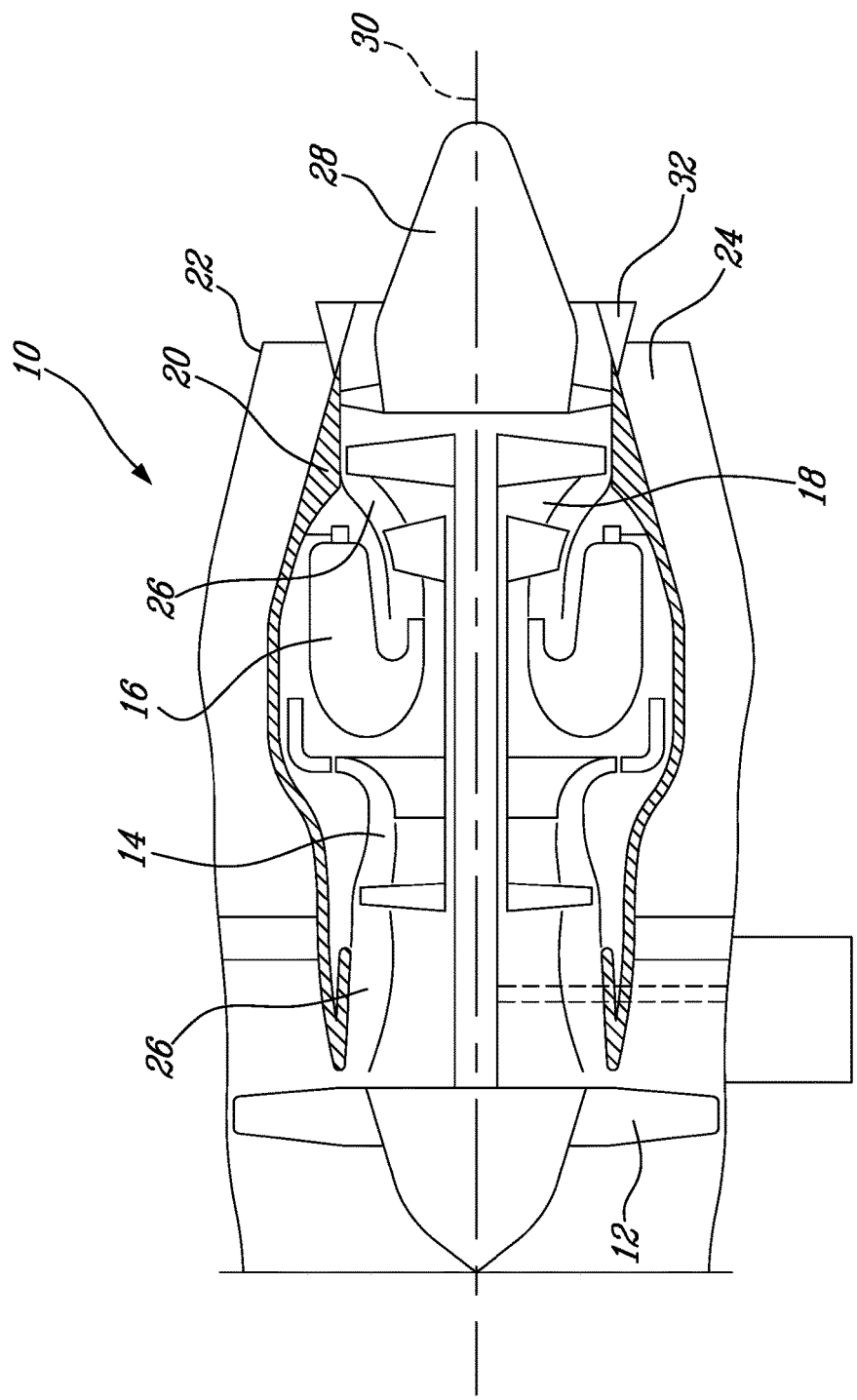
FIG. 1 is a schematic cross-sectional view of a turbofan gas turbine engine having a segmented multi-lobe exhaust mixer.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine 10, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a core flow path 26 which is defined within the first casing 20 and allows the flow to circulate through the multistage compressor 14, combustor 16 and turbine section 18 as described above.

At the aft end of the engine 10, an axisymmetrical bullet 28 is centered on a longitudinal axis 30 of the engine 10 and defines an inner wall of the core flow path 26 so that the combustion gases flow therearound. A multi-lobe exhaust mixer 32 surrounds at least a portion of the bullet 28, the mixer 32 acting as a rearmost portion of the outer wall defining the core flow path 26 and a rearmost portion of the inner wall defining the bypass passage 24. The hot combustion gases from the core flow path 26 and the cooler air from the bypass passage 24 are thus mixed together by the mixer 32 at the exit thereof such as to produce an exhaust with a reduced temperature.

Figure 2:
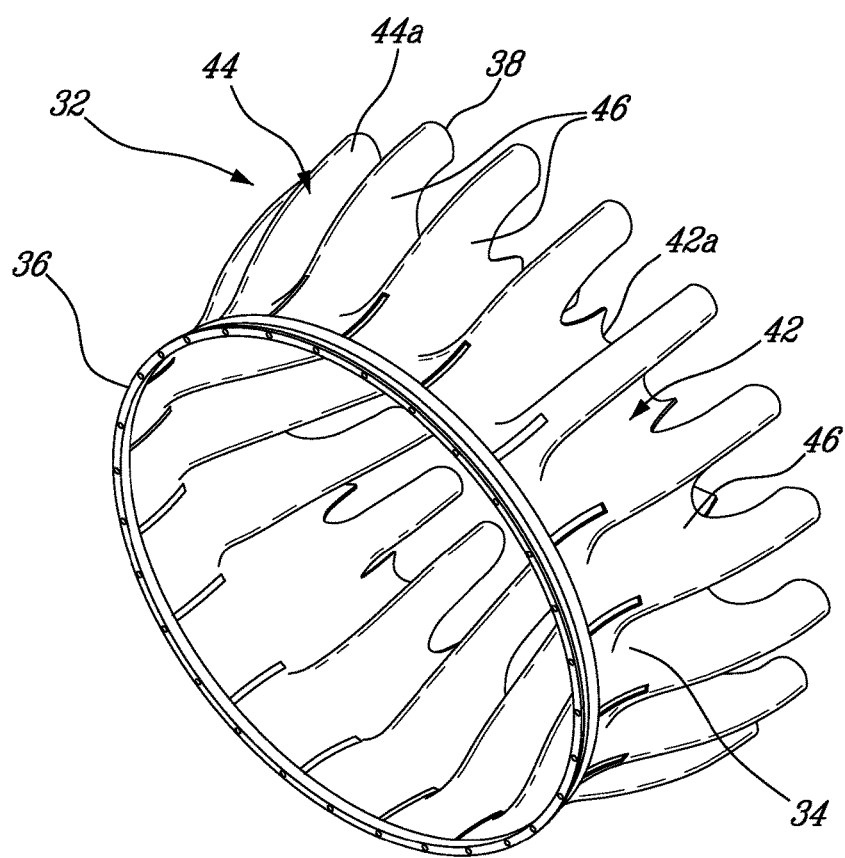
FIG. 2 is a front isometric view of the segmented multi-lobe exhaust mixer.

Referring to FIG. 2, the mixer 32 has a generally annular body 34 extending from an upstream end 36 along which the flows from the core flow path 26 and from the bypass passage 24 are received to a downstream end 38 where the two flows meet and are mixed together. The annular body 34 defines a plurality of circumferentially distributed lobes. The lobes include alternating inner and outer lobes 42, 44, with the outer lobes 44 extending radially outwardly into the bypass passage 24 and the inner lobes 42 extending radially inwardly into the core flow path 26. Each inner lobe 42 has a trough 42a forming an inner radial portion thereof. Likewise, each outer lobe 44 has a crest 44a forming an outer radial portion thereof. Adjacent inner and outer lobes 42, 44 have radially extending sidewalls 46 interconnecting adjacent troughs 42a and crests 44a, one sidewall being positioned between each trough 42a and each crest 44a, a complete lobe being formed by a pair of sidewalls and a trough or a crest.

Figure 3:
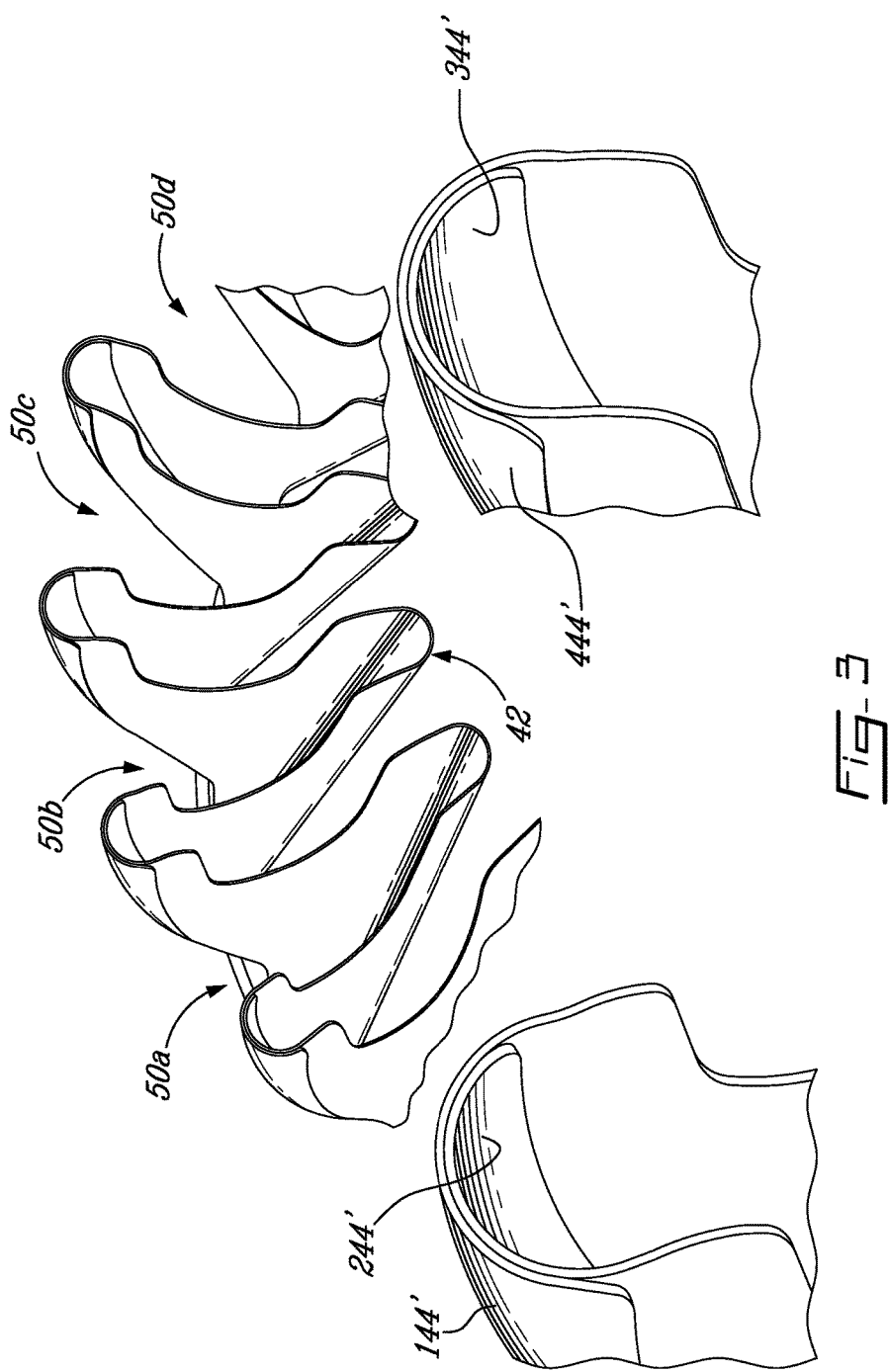
FIG. 3 is an enlarged view of a portion of the exhaust mixer illustrating the nesting assembly of individual loge segments.
Figure 4A:
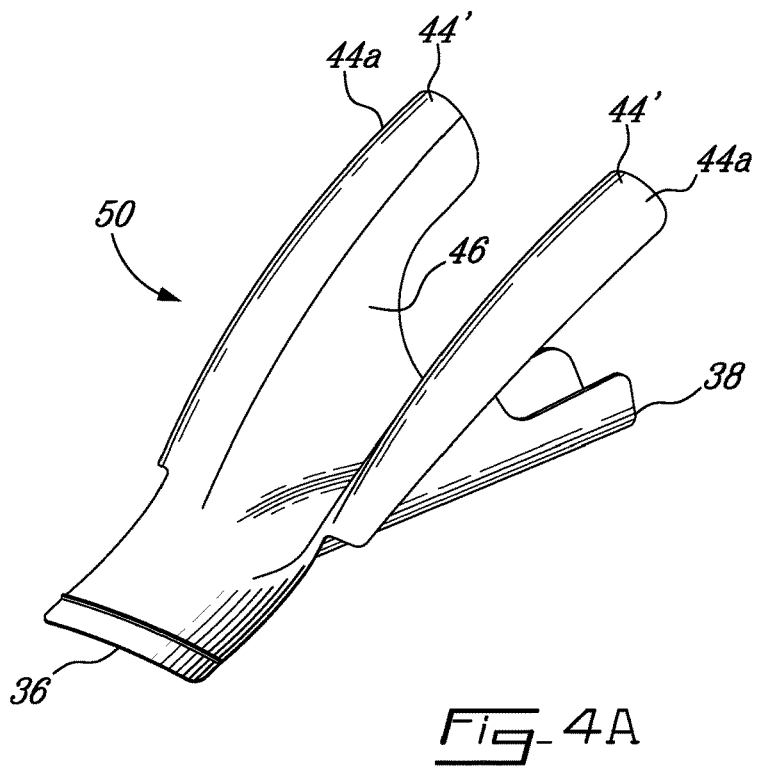
FIG. 4a is a front isometric view of an example of an individual lobe segment comprising a pair of partial outer lobes at circumferentially opposed ends thereof and a complete inner lobe therebetween.
Figure 4B:
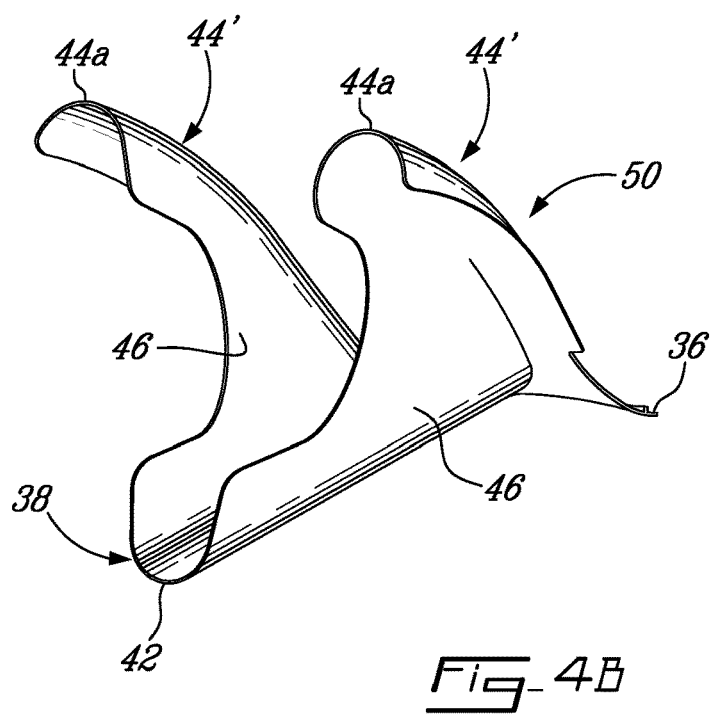

Referring now concurrently to FIGS. 3, 4a and 4b, it can be appreciated that the annular body 34 is segmented into a plurality of individual lobe segments 50a, 50b, 50c, 50d . . . etc. According to the illustrated embodiment, each lobe segment has a pair of partial outer lobes 44' (FIGS. 4a and 4b) at circumferentially opposed ends and a complete inner lobe 42 therebetween. However, it is understood each lobe segment 50 could comprise one or more complete outer lobe bordered by two partial inner lobes. It is also understood that each lobe segment 50a, 50b, 50c, 50d . . . could include more than one complete lobe. For instance, one segment could comprise a series of three lobes bordered at opposed circumferential ends by a pair of partial lobes. In the illustrated embodiment, the partial outer lobes 44' include one sidewall 46 and a crest 44a.

As shown in FIG. 3, the lobe segments 50 are connected together at the crests 44a of the partial outer lobes 44'. The crests 44a of the partial outer lobes 44' of adjacent lobe segments 50a, 50b, 50c, 50d . . . overlap each other. According to the illustrated embodiment, the partial outer lobes 44' are nested into each other. The partial outer lobes 44' of adjacent lobe segments combine to form a complete outer lobe 44 with the sidewalls of the complete lobe forming part of different lobe segments 50a, 50a, 50b, 50c, 50d. This nesting arrangement provides damping benefits when the exhaust mixer 32 is subjected to vibrations. As illustrated in the enlarged views of FIG. 3, the partial lobe 144' at a first circumferential end of a given lobe segment 50b may extend radially outwardly over an adjoining partial lobe 244' of a first adjacent lobe segment 50a while the partial lobe 344' at the opposed circumferential end of the lobe segment 50b extends radially inwardly underneath the adjoining partial lobe 444' of a second adjacent lobe segment 50c. The radially inwardly and radially outwardly overlapping arrangement alternate all around the segmented multi-lobe exhaust mixer 32.

Figure 7:
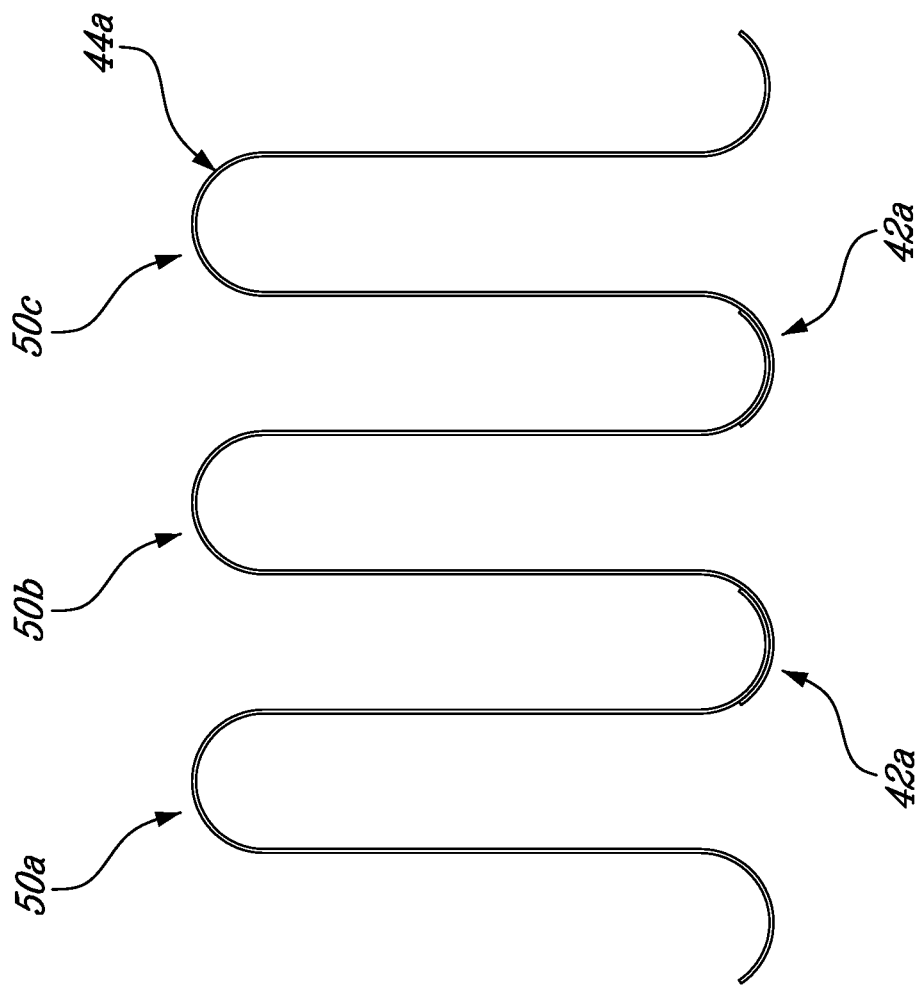
FIG. 7 is a schematic view illustrating individual lobe segments overlapping at the troughs.

It is understood that if the lobe segments are configured to comprise at least one complete outer lobe bordered by two partial inner lobes then the above described overlapping and nesting relationships of the individual lobe segments would take place at the troughs 42a instead of at the crests 44a (see FIG. 7).

The nested crest or trough arrangement provides for a stable while flexible lobe assembly which is well suited for accommodating thermal stresses and vibrations. Also, the modularity of the multi-lobe exhaust mixer 32 simplify the fabrication of the lobe structure, thereby providing more flexibility in the choice of material that can be used for manufacturing the mixer 32. According to one embodiment, each individual lobe segment 50a, 50b, 50c, 50d . . . can be made of a thermo-structural composite material known to have good mechanical properties at high temperature. For instance, the individual lobe segments could be made of a ceramic matrix composite (CMC) material, i.e. a material made of refractory reinforcing fibers (e.g. carbon or ceramic fibers) densified by a matrix constituted at least in part by ceramic. The use of a CMC material allows to reduce the weight of the exhaust mixer 32 compared with conventional metal exhaust mixers.

The modularity also allows to individually replace the lobes, thereby reducing replacement and maintenance costs. The use of individual lobe segments also provides for variable pitch and lobe shapes around the multi-lobe exhaust mixer 32. For instance, the lobes could have various curvatures to perform a tailored de-swirling function.

Figure 5:
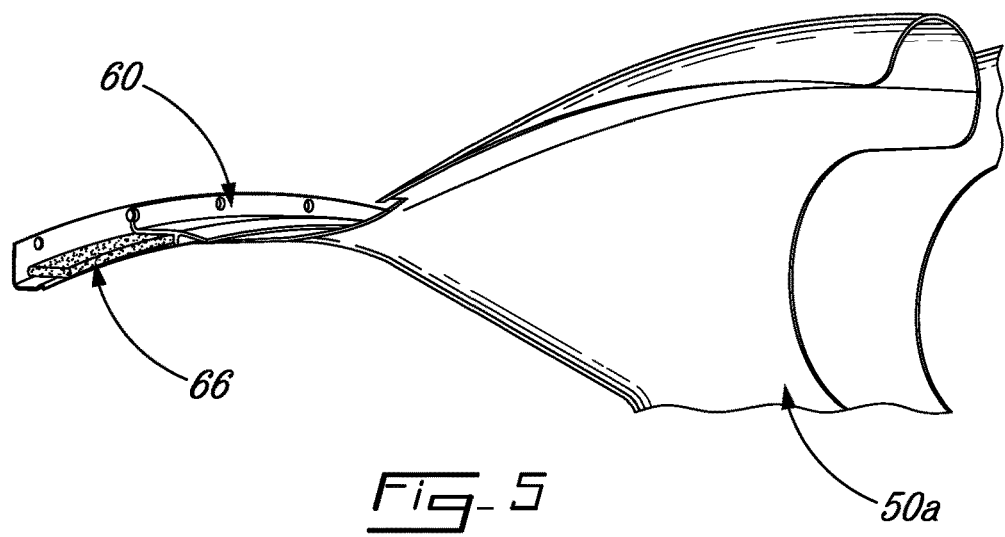
FIG. 5 is an enlarged rear isometric view of an individual lobe segment mounted at an upstream end thereof to a support ring or flange adapted to be bolted to the turbine exhaust casing.
Figure 6:
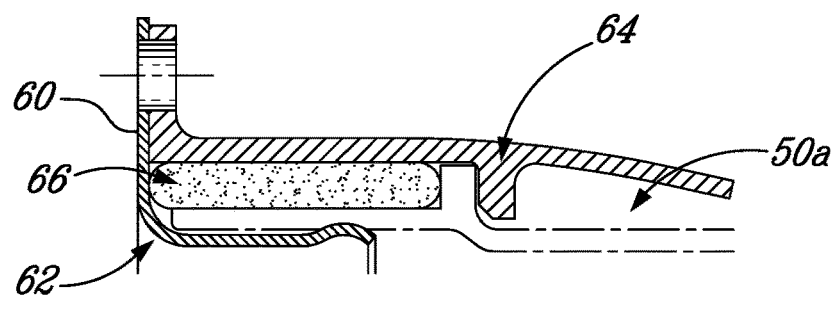
FIG. 6 is an enlarged side cross-section view illustrating one possible mounting arrangement of the upstream end of the lobe segments.

As shown in FIGS. 5 and 6, the individual lobe segments 50a, 50b, 50c, 50d . . . are mounted at their upstream end 36 to a support ring 60 adapted to be bolted or otherwise secured to the turbine exhaust case (not shown) of the engine 10. The support ring 60 may have a sheet metal spring loaded flange 62 upon which the individual lobe segments 50a, 50b, 50c, 50d . . . rest, thereby providing a vibration damping function. A separate flange 64 may be bolted or otherwise detachably mounted to the support ring 60 to axially retain and clamp the individual lobe segments 50a, 50b, 50c, 50d . . . on the support ring 60. A damping material, such as a resilient and high temperature resistant tape 66 or rope seal, may also be wrapped around the upstream end 36 of the individual lobe segments 50a, 50b, 50c, 50d . . . on the support ring 60 to increase radial damping. The resilient and high temperature resistant tape 66 may consist of a ceramic fiber tape, such as the one commercialized under the trade mark CerMax™.

Other lobe supporting structures (not shown) could be provided as well. For instance, a second support or stiffener ring (not shown) could be provided at the downstream end 38 of the multi-lobe exhaust mixer 32.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine comprising:
   a core flow passage;
   a bypass passage surrounding the core flow passage; and
   a multi-lobe exhaust mixer between the core flow passage and the bypass passage, the multi-lobe exhaust mixer comprising:
   an annular body having an array of circumferentially distributed alternating inner and outer lobes, the inner lobes including troughs forming an inner radial rounded portion thereof and the outer lobes including crests forming an outer radial rounded portion thereof, the annular body being segmented into a plurality of individual lobe segments, wherein the individual lobe segments alternately radially outwardly and radially inwardly overlap each other all around the annular body at the inner radial rounded portion of the inner lobes or the outer radial rounded portion of the outer lobes, and wherein the plurality of individual lobe segments are individually removable from the gas turbine engine, wherein each of the individual lobe segments has partial lobes at circumferentially opposed ends and at least one complete lobe therebetween, and wherein the partial lobes of one individual lobe segment are one of: radially inward of partial lobes of adjacent individual lobe segments, and radially outward of partial lobes of adjacent individual lobe segments.

2. The gas turbine engine defined in claim 1, wherein the individual lobe segments are made of a ceramic matrix composite (CMC) material.

3. The gas turbine engine defined in claim 1, wherein the individual lobe segments are mounted at an upstream end thereof to a support ring.

4. The gas turbine engine defined in claim 3, wherein the individual lobe segments are spring loaded on the support ring.

5. The gas turbine engine defined in claim 4, wherein the support ring has a sheet metal spring loaded flange upon which the individual lobe segments rest, and wherein a separate flange detachably mounted to support ring axially retain and clamp the individual lobe segments on the support ring.

6. The gas turbine engine defined in claim 5, wherein a damping material is wrapped around the upstream end of the individual lobe segments on the support ring, and wherein the separate flange extends over the damping material.

7. The gas turbine engine defined in claim 6, wherein the damping material is a ceramic fiber tape.

8. A gas turbine engine comprising:
a core flow passage for channeling a high temperature core flow along an axis of the gas turbine engine;
a bypass passage surrounding the high temperature core flow passage for channeling bypass air; and
a multi-lobe exhaust mixer comprising:
an annular body composed of a plurality of circumferentially adjacent lobe segments, each lobe segment having partial lobes at circumferentially opposed ends thereof and at least one complete lobe therebetween, the partial lobes of the circumferentially adjacent lobe segments combining to conjointly form complete lobes at a junction between the circumferentially adjacent lobe segments, wherein the partial lobes of one lobe segment are one of: radially inward of partial lobes of adjacent lobe segments, and radially outward of partial lobes of adjacent lobe segments.

9. The gas turbine engine defined in claim 8, wherein the partial lobes overlap at a crest or a trough, the crest projecting radially outwardly into the bypass passage, the trough projecting radially inwardly into the core flow passage.

10. The gas turbine engine defined in claim 9, wherein the partial lobes of circumferentially adjacent lobe segments nest within each other, the partial lobes having matching radius of the curvature.

11. A gas turbine engine comprising:
an annular core flow passage for channeling a high temperature core flow along an engine axis;
a bypass passage extending concentrically about the annular core flow passage for axially channeling bypass air; and
a multi-lobe exhaust mixer comprising:
an annular body having an array of circumferentially distributed alternating inner and outer lobes, the outer lobes protruding radially outwardly into the bypass passage and the inner lobes protruding radially inwardly into the annular core flow passage, the annular body being composed of a plurality of individual lobe segments which alternately radially outwardly and radially inwardly overlap each other all around the annular body, the individual lobe segments having rounded ends defining partial lobes nested into each other such that each of the individual lobe segments has said partial lobes at circumferentially opposed ends and at least one complete lobe therebetween, and wherein the partial lobes of one individual lobe segment are one of: radially inward of partial lobes of adjacent individual lobe segments, and radially outward of partial lobes of adjacent individual lobe segments.

12. The gas turbine engine defined in claim 11, wherein the inner lobes include troughs forming a rounded inner radial portion thereof and the outer lobes include crests forming a rounded outer radial portion thereof, and wherein circumferentially adjacent lobe segments overlap each other at the crests or the troughs.

13. The gas turbine engine defined in claim 11, wherein the individual lobe segments are clamped at an upstream end thereof to a support ring.

* * * * *